United States Patent

[11] 3,593,047

| [72] | Inventors | James P. Nolta<br>Warren;<br>Norman W. Schubring, Troy; Ronald A.<br>Dork, Utica, all of, Mich. |
|---|---|---|
| [21] | Appl. No. | 11,556 |
| [22] | Filed | Feb. 16, 1970 |
| [45] | Patented | July 13, 1971 |
| [73] | Assignee | General Motors Corporation<br>Detroit, Mich. |

[54] METHOD AND APPARATUS FOR CONVERTING HEAT TO MECHANICAL ENERGY
7 Claims, 3 Drawing Figs.

[52] U.S. Cl. ................................... 310/4, 310/5
[51] Int. Cl. ................................... H02n 4/00
[50] Field of Search ........................... 310/2, 4, 5, 6; 318/116

[56] References Cited
UNITED STATES PATENTS
3,238,396  3/1966  Schubring et al. ............ 310/4
3,517,225  6/1970  Klein ........................... 310/6

OTHER REFERENCES
" A Miniature Multipule Liquid-Immersed Dielectric Motor," Secker and Belmont, BRIT. J., APPL. PHYS., (J. Phys. D) (GB), Vol. 3, No. 2 (Feb. 1970)

Primary Examiner—D. F. Duggan
Attorneys—Jean L. Carpenter, Paul Fitzpatrick and Warren D. Hill ABSTRACT: A ferroelectric material having its permittivity dependent on temperature is disposed partially in an electric field between a pair of capacitor plates. A heat source is provided to heat the ferroelectric material just outside the capacitor plates to increase the permittivity above that existing between the capacitor plates so that a force pulls the heated portion into the field. The force is enhanced by providing a liquid of high permittivity between the ferroelectric material and the capacitor plates. By using a liquid having a permittivity between the upper and lower extremes of the ferroelectric material, a force is produced pushing the ferroelectric material, when cooled, out of the field.

PATENTED JUL 13 1971

3,593,047

INVENTORS.
James P. Nolta,
Norman W. Schubring, &
Ronald A. Dork
BY Warren D. Hill
ATTORNEY 3,593,047

METHOD AND APPARATUS FOR CONVERTING HEAT TO MECHANICAL ENERGY

This invention relates to heat motors and particularly to ferroelectric heat motors.

It is a general object of this invention to provide a method and apparatus for directly converting thermal energy to mechanical energy.

In particular it is an object of this invention to provide a ferroelectric heat motor.

A further object of the invention is to provide a method and apparatus utilizing ferroelectric material for converting thermal energy to rotary mechanical motion.

Yet another object is to provide a method and apparatus utilizing a ferroelectric material for converting thermal energy to linear reciprocating mechanical motion.

The invention is carried out by providing an electrical field between a pair of spaced capacitor plates and a ferroelectric member partially within that field and means for heating a portion of the ferroelectric just outside the field to increase the permittivity in the heated region to a value larger than that between the capacitor plates. The invention particularly contemplates filling any gap between the plates and the ferroelectric material with a dielectric medium having high permittivity.

The invention is further carried out by establishing an electrical field between a pair of spaced capacitor plates providing a ferroelectric mass partially between the plates, filling any voids between the plates with a dielectric liquid having a permittivity intermediate the permittivity range of the ferroelectric mass, supplying heat to the mass just outside the capacitor plates to increase the permittivity of the heated portion above the permittivity of the material between the plates, and cooling the mass between the plates to decrease its permittivity.

The above and other advantages will be made more apparent from the following specification taken in conjunction with the accompanying drawings wherein like reference numerals refer to like parts and wherein.

Figure 1:
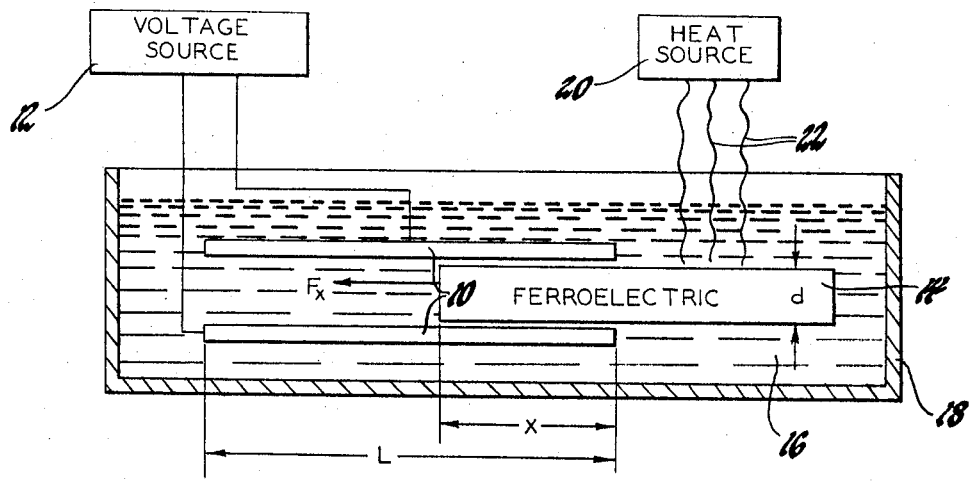
FIG. 1 illustrates a linear reciprocating dielectric motor according to the invention.

FIG. 1 illustrates a pair of capacitor plates 10 connected to a voltage source 12 to establish an electric field between the plates. As is well known, the fringe of the electric field occurring near the edges of the plates 10 will be a nonuniform field and will extend beyond the plate edges. A core 14 of ferroelectric material is disposed partially between the capacitor plates 10 and partially within the nonuniform fringe field. The plates 10 and the core 14 are immersed in a dielectric liquid 16 contained within a vessel 18. A heat source 20 supplies radiant energy depicted at 22 to a portion of the ferroelectric core 14 adjacent the plates 10. The ferroelectric core 14 preferably is sodium nitrite although other ferroelectrics may be used.

Figure 2:
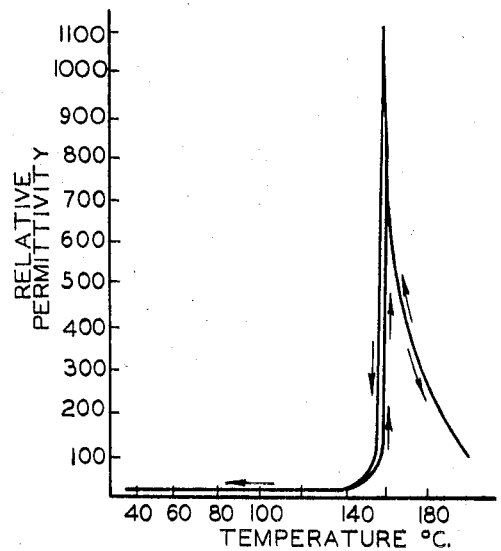
FIG. 2 is a graphical representation of permittivity vs. temperature of the ferroelectric material used in the embodiment of FIG. 1; and, FIG. 3 is a diagrammatic representation of a rotary dielectric heating motor according to another embodiment of the invention.

FIG. 2 graphically illustrates the variation of the relative permittivity of sodium nitrite with temperature. At room temperature the relative permittivity is 7.4 and at approximately 160° C., the relative permittivity equals 110. The Curie point or the peak of the curve occurs at 164° C. Thus the relative permittivity of sodium nitrite can be varied from 7.5 to 110 without passing through the Curie point. The dielectric liquid 16 is chosen to have a relative permittivity between 7.5 and 110. Examples of liquids having suitable relative permittivities (K) are methyl alcohol (K=35), liquid ammonia (K=27), and distilled and deionized water (K=81).

It is a well-known principle that a material is pulled into an electric field if the permittivity of the material is higher than that of the material originally in the field. Conversely, a material is expelled from a field if its permittivity is lower than that of a material available to occupy the field. Thus, in the embodiment of FIG. 1, if the temperature of the ferroelectric core 14 is low so that its permittivity is less than that of the liquid 16, the core will be forced to the right, away from the plates 10. When, however, the ferroelectric core is heated, particularly in the fringe area of the field and its permittivity is increased to a value higher than that of the liquid 16, then there will be a force acting to pull the core 14 to the left into the field between the plates 10. The magnitude of the force $F_x$ can be shown to be $$F_x = \frac{V^2}{2} \frac{e_0 w}{d} (K_f - K_d)$$

where $V$ is the voltage across the plates, $d$ is the space between the plates $w$ is the width of the plates, $e_0$ is the permittivity of vacuum, $K_f$ is the relative permittivity of the ferroelectric core and $K_d$ is the relative permittivity of the dielectric material. This formula assumes that the ferroelectric core is equal in thickness to the spacing $d$ between the plates. When the core thickness is smaller thereby leaving a gap between the core and each plate 10 as shown in FIG. 1, and this gap is filled with a dielectric liquid 16, then the force $F_x$ will be somewhat reduced in value.

If the dielectric liquid 16 were omitted and its place taken by air or vacuum, then there would still be a force pulling the ferroelectric into the field but no force could be developed in the opposite direction. Moreover, if there were airgaps between the core 14 and the plates 10, the force $F_x$ would become very small because the electric field energy would be stored primarily in the low permittivity airgaps and very little energy would be stored in the relatively high permittivity core. Thus the advantage of the liquid dielectric is apparent. A further advantage of the liquid is that it aids in dissipating heat from the core 14 so that the core will cool after being drawn into the field between the plates 10. If desired, the fluid may be pumped in an appropriate manner to expedite the cooling process.

To summarize the operation of the heat motor, if the core 14 is heated, its permittivity increases to a value higher than that of the liquid 16 and the core is pulled into the field between the plates 10 and away from the influence of the heat source 20. The core 14 will then cool until its permittivity decreases below that of the liquid 16 and it will be expelled from between the plates 10. Then it will again be exposed to the heat source 20 so that the cycle will be repeated. Of course, the motion of the core 14 may be utilized in any manner by connection to an external utilization system, not shown.

It will further be apparent that various types of heat sources may be used and similarly, many expedients may be devised for applying the heat to the core 14. By way of example, it is not necessary that the core 14 be entirely submersed in the liquid 16. The apparatus may be disposed so that a portion of the core 14 extending beyond the plates 10 will protrude above the surface of the liquid 14, thereby simplifying the application of heat thereto.

Figure 3:
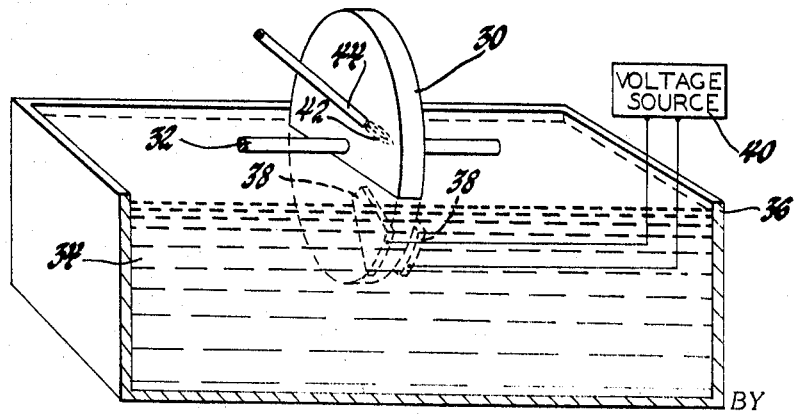

FIG. 3 illustrates another embodiment of the invention directed to an apparatus for converting heat to rotary mechanical motion. A ferroelectric rotor or disc 30 is rigidly mounted on a shaft 32 for rotation therewith. A lower portion of the disc 30 is immersed in a dielectric liquid 34 within a vessel 36. A pair of capacitor plates 38 in the liquid are disposed on opposite sides of the disc 30 and are connected to a voltage source 40 for establishing an electrical field between the plates 38. An apparatus for heating the ferroelectric disc 30 adjacent the plates 38 is depicted by a flame 42 from a blowpipe 44 directed against the disc 30. As the disc 30 is heated in the indicated region, its permittivity there is increased to a value higher than that of the cooler material residing between the plates 38 and there will be a force on the heated portion pulling the heated portion into the space between the plates 38 causing the disc 30 and the shaft 32 to rotate. This embodiment differs from that of FIG. 1 in that the ferroelectric material upon moving, does not displace the dielectric liquid 34 so that the force turning the disc 30 is a function of the difference of permittivity between the heated and cooled portions of the disc 30. The rotary heat motor will, in principle, operate in air. However, for the reasons given previously, its operation is greatly enhanced by providing the dielectric liquid 34 to fill the gaps between the plates 38 and the disc 30. For this purpose, it is advantageous to choose a dielectric liquid having a very high permittivity. The liquid is useful also in cooling the portion of the disc 30 between the plates 38. The operation of the embodiment of FIG. 3, in summary, is that heat applied to the ferroelectric disc 30 in the nonuniform electric field region at the edge of the plates increases the local permittivity with the result that this local volume is drawn into the region of the stronger electric field that lies immediately between the plates 38. As this local volume cools, it is free to egress from the opposite side of the plates. This action is continuous in that there is a continuous temperature gradient and consequently a resultant permittivity gradient that lies within an electrical field gradient. The electrical energy stored at any one angular position of the disc 30 is constant but the heat energy goes into causing rotation of the ferroelectric disc. Obviously, if desired, this rotary configuration can be extended to incorporate several sets of capacitor plates with several corresponding heat sources.

The embodiment of the invention described herein is for purposes of illustration and the scope of the invention is intended to be limited only by the following claims:

We claim:

1. A ferroelectric heat motor for converting heat to mechanical energy comprising
    a pair of spaced capacitor plates,
    means for establishing an electric field between the plates to provide a nonuniform fringe field at the edge of at least one of the plates,
    a solid ferroelectric mass partially in the nonuniform field and mounted for movement relative to the field, the mass having a low permittivity at temperature and a high permittivity at a higher temperature, and
    means for selectively heating the portion of the solid mass in the nonuniform field to raise its temperature and its permittivity so that a force is developed pulling the heated portion into the field between the plates.

2. A ferroelectric heat motor for converting heat to mechanical energy comprising
    a pair of spaced capacitor plates,
    a dielectric liquid immersing the capacitor plates,
    means for establishing between the plates an electrical field having a nonuniform fringe field,
    a ferroelectric mass partially in the field and mounted for movement relative to the field, the permittivity of the mass at one temperature being lower than that of the liquid and a higher temperature being higher than that of the liquid,
    means for heating the portion of the mass in the nonuniform field to higher temperature whereby the heated portion is pulled into the field between the plates.

3. A reciprocating ferroelectric heat motor for converting heat to mechanical energy comprising
    a pair of spaced capacitor plates,
    a dielectric liquid immersing the capacitor plates,
    means for establishing between the plates an electric field having a nonuniform fringe field, and
    a ferroelectric mass extending through the fringe field and partially between the plates and mounted for linear movement relative to the plates, the permittivity of the mass at one temperature being below that of the liquid and at higher temperature being above that of the liquid, and
    means for intermittently heating and cooling the mass to alternately change its temperature between the one temperature and the higher temperature, whereby the mass when heated is pulled into the space between the plates and when cooled is thrust out of the space between the plates.

4. A rotary ferroelectric heat motor for converting heat to energy comprising
    a ferroelectric member mounted for rotation, the member having a low permittivity at one temperature and a higher permittivity at another temperature,
    a pair of spaced capacitor plates one on either side of a portion of the member and at least one of the plates separated from the member by a gap,
    means for establishing an electrical field between the plates,
    a dielectric material of high permittivity in the gap, and
    means for heating the member in a region adjacent the capacitor plates to increase the dielectric constant of the heated portion of the member to a value higher than the portion of the member between the plates, whereby the heated portion is pulled into the space between the plates to cause rotation of the member.

5. A method of converting heat to mechanical energy comprising
    establishing an electric field,
    providing a ferroelectric mass partially in the field, the mass having a low permittivity at one temperature and a high permittivity at another temperature, and
    heating a portion of the ferroelectric mass under the influence of the field to cause a permittivity gradient in the mass which reacts with the field to produce a force on the ferroelectric mass which causes its movement relative to the field.

6. A method of converting heat to reciprocating mechanical motion comprising
    establishing an electric field within a dielectric fluid medium,
    providing a ferroelectric mass partially in the field, the mass having at one temperature a permittivity lower than that of the fluid medium and at another temperature a permittivity higher than that of the fluid medium,
    alternately heating and cooling a portion of the ferroelectric mass in the influence of the electric field between the one temperature and the said another temperature to produce forces on the ferroelectric mass which cause it to reciprocably move relative to the field.

7. A method of converting heat to continuous rotary mechanical motion comprising
    establishing an electric field within a dielectric liquid having a high permittivity,
    providing a ferroelectric rotor partially in the field, the rotor having one permittivity at one temperature and a higher permittivity at a higher temperature,
    heating the rotor at a fringe area of the field to produce a localized high permittivity portion and
    cooling the rotor within the field to produce a permittivity gradient in the rotor so that by reaction with the field the rotor is caused to rotate.